United States Patent
Lindoff et al.

(10) Patent No.: US 10,945,249 B2
(45) Date of Patent: Mar. 9, 2021

(54) METHOD AND APPARATUS FOR ADAPTIVE BANDWIDTH USAGE IN A WIRELESS COMMUNICATION NETWORK

(71) Applicant: Telefonaktiebolaget LM Ericsson (publ), Stockholm (SE)

(72) Inventors: Bengt Lindoff, Bjärred (SE); Robert Baldemair, Solna (SE); Stefan Parkvall, Bromma (SE); Lars Sundström, Södra Sandby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/572,175

(22) PCT Filed: Oct. 10, 2017

(86) PCT No.: PCT/EP2017/075731
§ 371 (c)(1),
(2) Date: Nov. 7, 2017

(87) PCT Pub. No.: WO2018/069270
PCT Pub. Date: Apr. 19, 2018

(65) Prior Publication Data
US 2018/0295607 A1     Oct. 11, 2018

Related U.S. Application Data

(60) Provisional application No. 62/406,112, filed on Oct. 10, 2016.

(51) Int. Cl.
*H04W 72/04* (2009.01)
*H04W 28/20* (2009.01)
(Continued)

(52) U.S. Cl.
CPC ......... *H04W 72/042* (2013.01); *H04L 5/0044* (2013.01); *H04L 5/0053* (2013.01);
(Continued)

(58) Field of Classification Search
CPC ........... H04W 72/042; H04W 72/0413; H04W 72/12; H04W 72/005; H04W 28/00;
(Continued)

(56) References Cited

U.S. PATENT DOCUMENTS 7,796,566 B2 * 9/2010 Xhafa .................. H04W 36/06
370/329
8,144,679 B2 * 3/2012 Cai ...................... H04W 40/005
370/342

(Continued)

FOREIGN PATENT DOCUMENTS

JP    2014207598 A    10/2014
JP    2015502089 A    1/2015
(Continued)

OTHER PUBLICATIONS

Unknown, Author, "3rd Generation Partnership Project; Technical Specification Group Radio Access Network; Evolved Universal Terrestrial Radio Access (E-UTRA); Multiplexing and Channel Coding (Release 14)", 3GPP TS 36.212 V14.0.0, Sep. 2016, pp. 1-148.

(Continued)

*Primary Examiner* — Hanh N Nguyen
(74) *Attorney, Agent, or Firm* — Murphy, Bilak & Homiller, PLLC

(57) ABSTRACT

A network node and a wireless device for operation in a wireless communication network, wherein it is determined that a second scheduling bandwidth is needed, based on an amount or type of data buffered for transmission to the wireless device. Reconfiguration of a receiver bandwidth of (Continued)

the wireless device is initiated to match the second scheduling bandwidth, wherein the second scheduling bandwidth is larger than a first scheduling bandwidth currently associated with the wireless device, and wherein the first and second scheduling bandwidths respectively define the bandwidth used for scheduling transmissions to the wireless device. Methods and computer programs therefor are also disclosed.

10 Claims, 7 Drawing Sheets

(51) Int. Cl.
  *H04L 5/00* (2006.01)
  *H04W 4/70* (2018.01)
(52) U.S. Cl.
  CPC ........... *H04L 5/0091* (2013.01); *H04W 28/20* (2013.01); *H04W 72/044* (2013.01); *H04W 4/70* (2018.02)
(58) Field of Classification Search
  CPC ..... H04W 28/18; H04W 28/20; H04W 28/24; H04W 28/16; H04W 72/1278; H04W 28/0268; H04W 40/005; H04W 36/06; H04L 5/0007; H04L 5/0053
  See application file for complete search history.

(56) References Cited

U.S. PATENT DOCUMENTS

| | | | | |
|---|---|---|---|---|
| 8,254,314 B2* | 8/2012 | Kang | ................ | H04L 1/0002 |
| | | | | 370/229 |
| 8,270,435 B2* | 9/2012 | Olszewski | ............ | H04L 5/0007 |
| | | | | 370/208 |
| 8,768,373 B2* | 7/2014 | Soliman | ................ | H04W 16/02 |
| | | | | 455/452.1 |
| 9,444,635 B2* | 9/2016 | Kanniappan | ........ | H04L 12/1822 |
| 9,538,517 B2* | 1/2017 | Baldemair | .......... | H04L 27/2666 |
| 9,560,660 B1* | 1/2017 | Oroskar | .................... | H04L 5/00 |
| 9,609,637 B2* | 3/2017 | Hammarwall | ...... | H04W 72/042 |
| 9,642,145 B2* | 5/2017 | Roberts | ................. | H04W 28/16 |
| 9,936,517 B2* | 4/2018 | Kotecha | ........... | H04W 72/1242 |
| 10,736,087 B2* | 8/2020 | Tabet | .................... | H04L 5/0098 |
| 2009/0176502 A1* | 7/2009 | Kuo | ....................... | H04W 72/14 |
| | | | | 455/450 |
| 2012/0275335 A1 | 11/2012 | Huang | | |
| 2013/0115967 A1 | 5/2013 | Soliman et al. | | |
| 2016/0127991 A1 | 5/2016 | Ang et al. | | |
| 2017/0054568 A1* | 2/2017 | Lee | ....................... | H04W 16/32 |
| 2018/0254794 A1* | 9/2018 | Lee | ..................... | H04J 11/0069 |

FOREIGN PATENT DOCUMENTS

| | | |
|---|---|---|
| RU | 2595271 C2 | 8/2016 |
| WO | 2010148022 A1 | 12/2010 |
| WO | 2013070731 A1 | 5/2013 |
| WO | 2016069115 A1 | 5/2016 |
| WO | 2017200729 A1 | 11/2017 |

OTHER PUBLICATIONS

Unknown, Author, "3rd Generation Partnership Project; Technical Specification Group Radio Access Network; Evolved Universal Terrestrial Radio Access (E-Utra); Physical Layer Procedures (Release 13)", 3GPP TS 36.213 V12.8.0, which corresponds to V13.0.0, Dec. 2015, pp. 1-218.

Unknown, Author, "On Techniques for Enhanced UE Power Efficiency Document for: Discussion", 3GPP TSG RAn WG1 Meeting #86bis, R1-1609557, MediaTek Inc., Lisbon, Portugal, Oct. 10-14, 2016, pp. 1-5.

Unknown, Author, "Considerations on NR-PDCCH Design", 3GPP TSG RAN WG1 Meeting #86bis, R1-1609558, MediaTek Inc., Lisbon, Portugal, Oct. 10-14, 2016, pp. 1-5.

* cited by examiner

METHOD AND APPARATUS FOR ADAPTIVE BANDWIDTH USAGE IN A WIRELESS COMMUNICATION NETWORK

TECHNICAL FIELD

The present invention generally relates to wireless communication, and particularly relates to adapting the scheduling bandwidth used for scheduling transmissions to a wireless device and corresponding adaptations of the receiver bandwidth used by the wireless device.

BACKGROUND

The current cellular Long Term Evolution (LTE) standard supports flexible bandwidth (BW), from 1.4 MHz up to 20 MHz, and even wider bandwidths using carrier aggregation techniques. In order for a wireless device—e.g., a "UE" in 3GPP parlance—to connect to a network (NW) node, such as an eNodeB or other base station, the wireless device must determine the cell carrier frequency as well as the system bandwidth to use. Furthermore, in current LTE standards there is a requirement that the NW node and the wireless device support and connect using the same system BW. Hence, the wireless device must search for relevant control messages over the entire system BW of the NW.

For the upcoming new radio-access technology in 5G, denoted NR herein, a more generic approach is desirable with respect to the system bandwidths of respective nodes. NR should support multiple types of wireless devices. A range of device types includes, for example, high-end Mobile Broadband (MBB) devices capable of supporting system BWs up to several GHz, down to low-cost, low-power Machine Type Communication (MTC) devices, which may support BWs of 100 kHz or perhaps a few MHz.

Hence, one of the capabilities desired for NR systems is flexibility in allocating "scheduling" BWs to respective wireless devices. Here, "scheduling BW" is the BW determined and signalled by the network to a wireless device such that the wireless device may apply a receive BW in which it may search for a control channel. In particular, in contrast to prior releases of LTE (and other, earlier-generation network standards), it is recognized herein that NR systems should have the ability to allocate a "scheduling" bandwidth to any given device that lies anywhere within the overall system BW configured for the supporting NW node. The allocated scheduling bandwidth may equal or be less than the BW supported by the device.

eMTC is part of Release 13 by the 3GPP and, among other things, provides for lower bandwidths in the uplink and downlink, lower data rates and reduced transmit power, all benefitting at least certain types of MTC devices. While the eMTC enhancements allow for an MTC device to operate on a BW smaller than the system BW of the supporting NW node it connects with, the approach lacks the flexibility needed for NR systems because it is based on using a fixed 1.4 MHz BW.

Hence, it is recognized herein that there remains a need for a method and apparatus to provide the signalling needed between NR networks and the devices operating in them, to support flexible scheduling BW allocations.

SUMMARY

Aspects of the invention are provided by the independent claims appended hereto, and embodiments thereof are defined by the dependent claims.

In one aspect of the teachings herein, a wireless communication network dynamically adapts the scheduling bandwidth allocated for transmitting to a wireless device, and correspondingly controls or initiates a complementary reconfiguration of the receiver bandwidth used by the device. In another aspect of the teachings herein, a wireless device dynamically adapts its receiver bandwidth to match the scheduling bandwidth being used by the network for transmitting to the device.

In an example scenario or implementation, the network receives capability information from the device, indicating support for dynamic adaptation of its receiver bandwidth. The capability information may indicate the nature or extent of bandwidth adaptability at the device and one or more nodes in the network may use the reported capability information to configure first and second receiver bandwidths to be used by the device on a selective basis. The network may also determine timing parameters, such as a first reception inactivity timer to be used by the device for falling back to a lower-bandwidth configuration from a higher-bandwidth configuration, and a second reception inactivity timer to be used for putting receiver circuitry in a low-power or off mode. Such operations may be performed in the context of discontinuous reception (DRX) cycle operations at the device.

Continuing with the example scenario or implementation, the network may allocate a first scheduling bandwidth for transmitting data to the device and operate according to the first scheduling bandwidth unless or until it is decided that a larger bandwidth is needed, at least temporarily. In response to that decision, the network allocates a larger, second bandwidth for transmitting to the device and signals the change to the device. The reconfiguration signalling received by the device causes it to reconfigure its receiver bandwidth to match the larger, second scheduling bandwidth. At the changeover, the network may delay any transmissions to the device in the second scheduling bandwidth, to allow time for the device to reconfigure its receiver circuitry, and the device may use the aforementioned reception inactivity timer(s) to revert back to the first receiver bandwidth.

As noted, the particulars of the first and second receiver bandwidths may be configured by the network, based on capability information received from the device (or based on default or known capabilities in other embodiments), and configuration signalling may be sent from the network to the device, to identify the particulars of the first and second bandwidths. With that approach, low-overhead reconfiguration signalling can be used, e.g., a simple indication from the network to the device, indicating that the device should change from operating with the first receiver bandwidth to operating with the second receiver bandwidth.

As for deciding when to make bandwidth adaptations, the network, e.g., a network node serving the device, in one or more embodiments decides to change to a larger scheduling bandwidth allocation in dependence on the amount, size, or nature of data buffered for transmission to the device. Additionally, or alternatively, the rate of data incoming to the serving node for transmission by the serving node is used to make the decision. As a further addition or alternative, the decision is made based on quality-of-service or other transmission requirements trigger.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
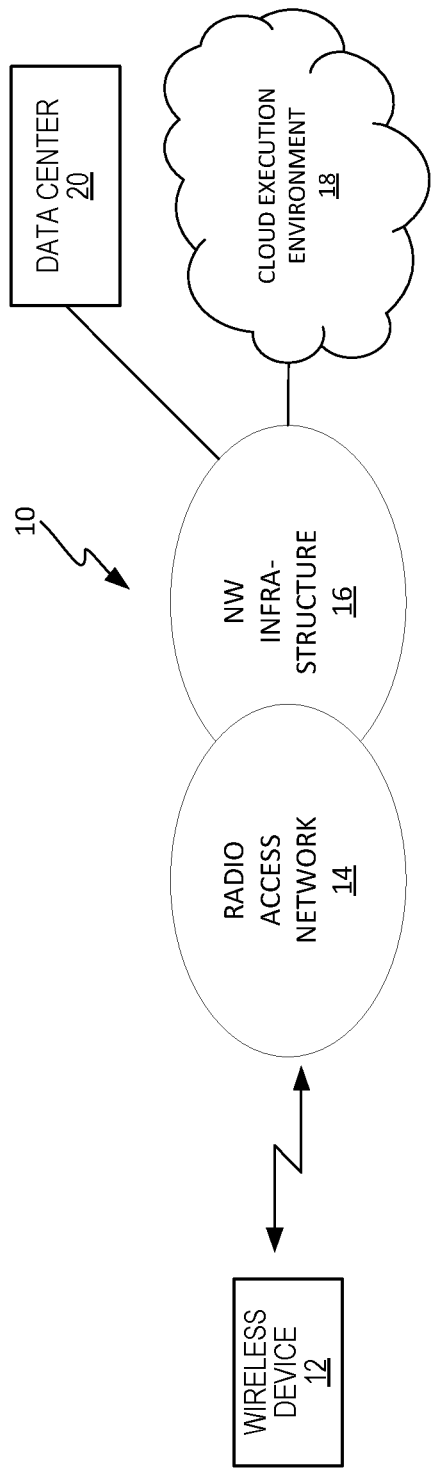
FIG. 1 is a block diagram of one embodiment of a wireless communication network configured according to the teachings herein.

FIG. 1 depicts an example embodiment of a wireless communication network 10 that is configured to communicatively couple to a wireless device 12, to provide one or more communication services to the wireless device 12. By way of example, the wireless communication network 10 ("network 10") provides Internet or other packet-data connectivity for the wireless device 12. More particularly, the network 10 and the wireless device 12 operate according to the flexible scheduling bandwidth allocations and power-efficient operations described herein.

According to the simplified depiction given in FIG. 1, the network 10 includes a Radio Access Network (RAN) 14 and associated network (NW) infrastructure 16. The NW infrastructure includes, for example, data processing, switching, and storage functions, along with providing mobility management and routing interfaces into and out of the RAN 14. The network infrastructure 16 may communicatively couple to a cloud execution environment 18—e.g., providing one or more Network Functions (NFs) or application services—and may also couple to one or more data centres 20. Further, there may be more than one RAN 14, and more than one type of Radio Access Technology (RAT) involved.

In some embodiments, the network 10 comprises a so-called "5G" network, also referred to herein as a "NR" network or system, where "NR" denotes "New Radio". According to one contemplated implementation, the network 10 represents an evolution of LTE for existing spectrum in combination with new radio access technologies that primarily target new spectrum. Among its key technology components, the network 10 in a 5G implementation includes access/backhaul integration, device-to-device communication, flexible duplex, flexible spectrum usage, multi-antenna transmission, ultra-lean design, and user/control data separation. Here, ultra-lean design refers to the minimization of any transmissions not directly related to the delivery of user data, and the RAN 14 may be configured to rely heavily on beamforming for the delivery of user data via one or more narrow, dynamically-allocable antenna beams.

Other points of flexibility and breadth apply to the wireless device 12 ("device 12"). Firstly, the network 10 may support potentially many devices 12, and the various devices 12 may be of different types and may be engaged in different types of communication services. For example, a device 12 configured for Mobile BroadBand (MBB) services may be used by a person to access movies, music, and other multimedia content delivered through the network 10. On the other hand, a device 12 configured for embedded operation may not include any user interface, and may engage only in low-power, low-rate Machine Type Communication (MTC) transmissions or receptions. Thus, by way of example rather than limitation, the device 12 may be a smartphone, a feature phone, a wireless modem or other wireless network adaptor, a laptop computer, a tablet or other mobile computing device, a sensor, an actuator, a relay, or essentially any other wireless communication apparatus configured for accessing the network 10 and operating according to any one or more of the RATs supported by the network 10. Still further, the device 12 may be a mobile device or may be installed or operated in a fixed location.

Figure 2:
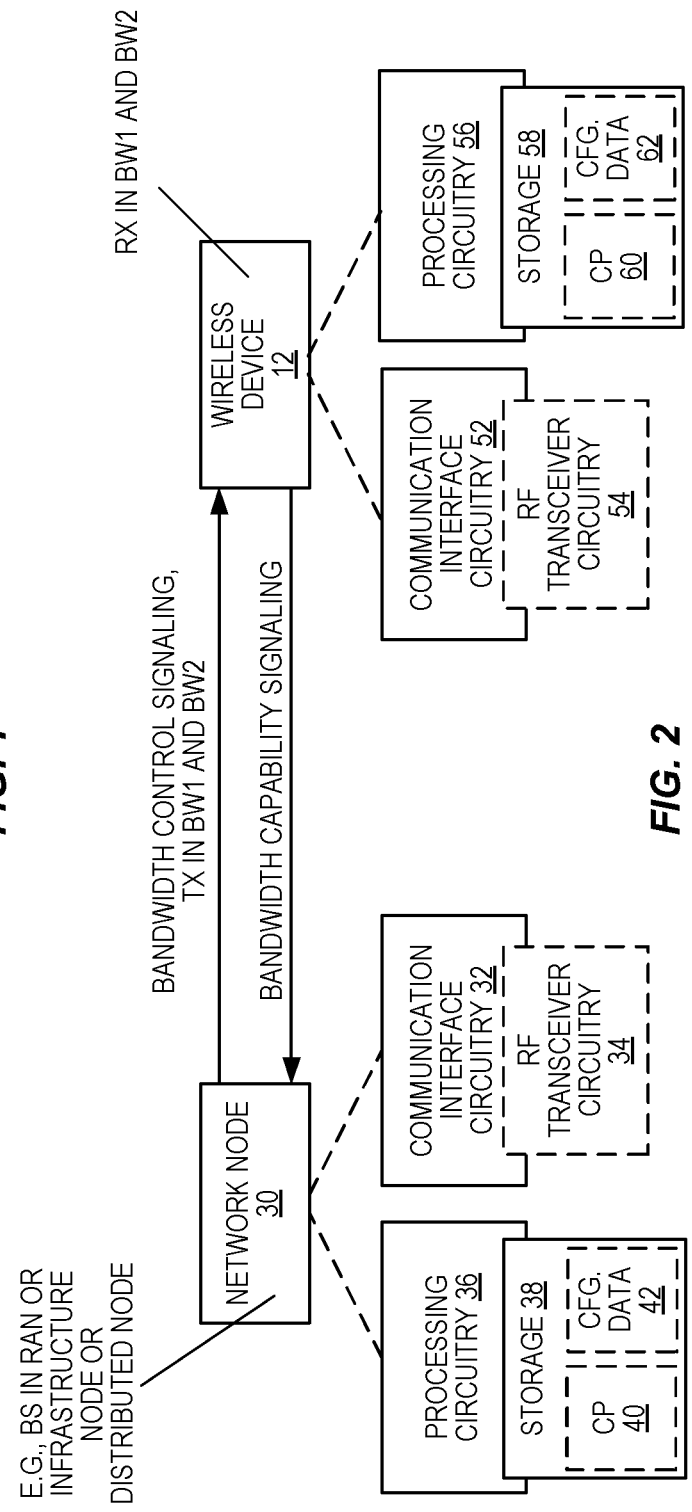
FIG. 2 is a block diagram of example details for a network node and a wireless device configured for operation in a wireless communication network.

FIG. 2 depicts example implementation details for the device 12 and for a network node 30 that is configured to support network-side aspects of the teachings herein. The network node 30 includes communication interface circuitry 32, which in turn includes radio frequency transceiver circuitry 34—i.e., one or more radio frequency transmitter and receiver circuits—for wirelessly communicating with one or more devices 12, according to one or more RATs. Further, in at least one embodiment, the communication interface circuitry 32 includes one or more network interfaces—e.g., Ethernet or other intra-node interface—for communication with one or more other nodes in the network 10, and may not have radio frequency circuitry. In such embodiments, the network node 30 may communicate indirectly with the device 12, e.g., through another node that has radio frequency circuitry.

The network node 30 also includes processing circuitry 36 that is operatively associated with the communication circuitry 32. The processing circuitry 36 comprises programmed circuitry or fixed circuitry, or a combination of programmed and fixed circuitry. In an example embodiment, the processing circuitry 36 comprises one or more microprocessors, Digital Signal Processors (DSPs), Field Programmable Gate Arrays (FPGAs), Application Specific Integrated Circuits (ASICs), or other digital processing circuits.

In at least one embodiment, the processing circuitry 36 is configured at least in part based on its execution of computer instructions included in one or more computer programs 40 stored in storage 38 in the network node 30. The storage 38 may also store one or more items of configuration data 42 associated with operation of the network node 30 according to the teachings herein. The storage 38 comprises, for example, one or more types of computer-readable media, such as Solid State Disk (SSD), FLASH, DRAM, SRAM, etc. In one embodiment, the storage 38 provides for long-term storage of the computer program(s) 40, and further provides working memory for operation of the processing circuitry 36.

FIG. 2 also provides example implementation details for the device 12. The device 12 includes communication interface circuitry 52, which includes radio frequency transceiver circuitry 54—i.e., one or more radio frequency transmitter and receiver circuits—for wirelessly communicating with the network 10, according to one or more RATs.

The device 12 also includes processing circuitry 56 that is operatively associated with the communication circuitry 52. The processing circuitry 56 comprises programmed circuitry or fixed circuitry, or a combination of programmed and fixed circuitry. In an example embodiment, the processing circuitry 56 comprises one or more microprocessors, Digital Signal Processors (DSPs), Field Programmable Gate Arrays (FPGAs), Application Specific Integrated Circuits (ASICs), or other digital processing circuits.

In at least one embodiment, the processing circuitry 56 is configured at least in part based on its execution of computer instructions included in one or more computer programs 60 stored in storage 58 in the device 12. The storage 58 may also store one or more items of configuration data 62 associated with operation of the device 12 according to the teachings herein. The storage 58 comprises, for example, one or more types of computer-readable media, such as Solid State Disk (SSD), FLASH, DRAM, SRAM, etc. In one embodiment, the storage 58 provides for long-term storage of the computer program(s) 60, and further provides working memory for operation of the processing circuitry 56.

With the above in mind, the network node 30 is configured to send or initiate the sending of signalling indicating or configuring the scheduling bandwidth (BW) for given wireless devices 12. The network node 30 is further configured to signal changes in the scheduling BW, and to indicate, for example, first and second receiver BWs to be used by a device 12 for signal reception. As an example, the network node 30 indicates a first receiver BW to be used by a device 12, and then subsequently indicates a second receiver BW to be used by the device 12.

Still further, the network node 30, or another entity in the network, is configured to determine timer parameters needed for controlling the BW configuration changes at the device 12, e.g., for changing from the first receiver BW to the second receiver BW, or from the second receiver BW back to the first receiver BW. Here, the terms "receiver BW" and "scheduling BW" are used. The scheduling BW is set by the NW node and signalled to the wireless device. The wireless device sets its receiver BW based on the scheduling BW, e.g. to the same BW. These BWs may be defined in terms of the number of resource blocks which the wireless device e.g. scans for a control channel Here, it is common that control information will be provided on a smaller BW, and the size of the scheduled BW may depend on kind of provided service, load, capability of wireless device, etc. It is also contemplated to configure or otherwise indicate timer parameters to be used for receiver BW configuration changes at the device 12 when DRX mode is active.

Complementing these aspects of the disclosed teachings, the device 12 may be configured to use the configuration parameters to reduce receiver power consumption. In particular, the device 12 reduces its receiver power consumption by only using sufficient receiver BW for reception of data and/or Layer 1/Layer 2 control, based on the current user scenario and device needs.

Here, a "user scenario" may be defined by the number and/or nature of ongoing communication sessions. The nature of a communication session may be defined in terms of data sizes or amounts, the type of service or information being transmitted and any related Quality-of-Service (QoS) parameters, such as latency, minimum data rates, etc. Device needs may for example comprise power consumption, processing power, RF capabilities, battery status, etc.

In one example scenario, the device 12 operates with a first receiver BW and then reconfigures to a wider, second receiver BW, e.g., responsive to signalling from the network 10. The device 12 may be reconfigured to the second BW to facilitate the transmission of a larger amount of data or higher-rate data to the device 12, as compared to what could be supported using the first receiver BW.

It is also possible that at least a portion of the data that triggered the network 10 to change to the second scheduling bandwidth is delayed, e.g., as a consequence of higher-layer media protocols, and the device 12 may revert back to the first receiver bandwidth before the transmission of the delayed data by the network 10. However, at least in cases where the delayed data is transmitted in spectrum encompassed by the first receiver bandwidth, the device 12 will still receive and process the delayed data upon its transmission and, advantageously, may do so using lower-power or lower-complexity receiver settings associated with operation of its receiver circuitry in the first bandwidth.

In particular, these "late" packets may be handled by the device 12 before a DRX timer elapses, wherein the limited capacity associated with the first receiver BW is proper for that handling. Furthermore, if both high-demand sessions and low-demand sessions are performed simultaneously, transition to operation of the low-demand sessions will be smoother. A further advantage is that resources are saved when transmissions are limited in both BW and time.

Figure 3:
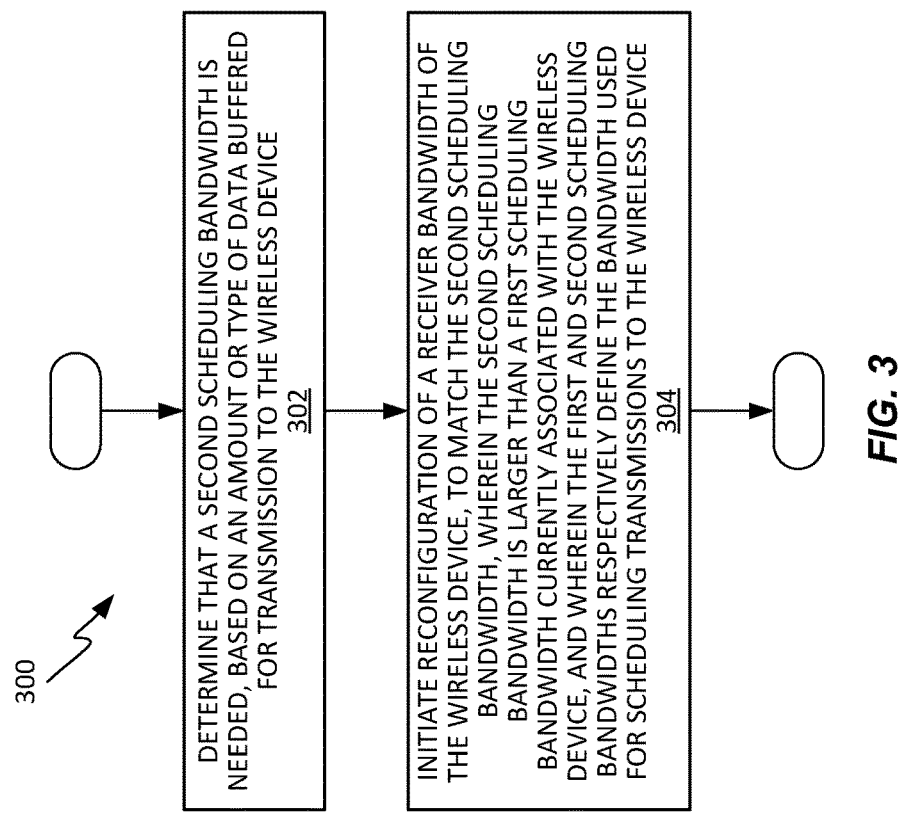

FIG. 3 illustrates one embodiment of a method 300 performed by a network node 30. The method 300 includes the network node 30 determining (Block 302) that a second scheduling BW is needed with respect to a particular device 12, based on an amount or type of data buffered for transmission to the device 12. Here, the network node 30 may operate as a "serving" node for the device 12 and may include radio transceiver circuitry and a scheduling processor, for carrying out scheduled data transmissions to the device 12, or the network node 30 may be communicatively coupled to the radio node that is serving the device 12.

In response to the decision that the second scheduling bandwidth is needed, the network node 30 initiates reconfiguration (Block 304) of a receiver bandwidth of the device 12, to match the second scheduling bandwidth. That is, the network node 30 sends a message, an information element, or other signalling or triggering, that causes or otherwise initiates a reconfiguration of reception (receiver) bandwidth at the device 12, so that the device 12 changes from operating with a first receiver bandwidth to operating with the second receiver bandwidth.

In this example, the second scheduling bandwidth is larger than a first scheduling bandwidth currently associated with the device 12 (matched at the device 12 by the first receiver bandwidth), and the first and second scheduling bandwidths respectively define the bandwidth, i.e. an upper bound of bandwidth usable for the scheduled transmission where circumstances may cause that only a part of the scheduled bandwidth is actually used, intended to be used for scheduling transmissions to the device 12. This processing can be understood as selectively and dynamically allocating more transmission resources to the device 12 on an as needed basis, with advantageous mechanisms for initiating corresponding reconfiguration of the receiver circuitry at the device 12, and with advantageous mechanisms for timing or otherwise managing the change from one bandwidth to another.

Figure 4:
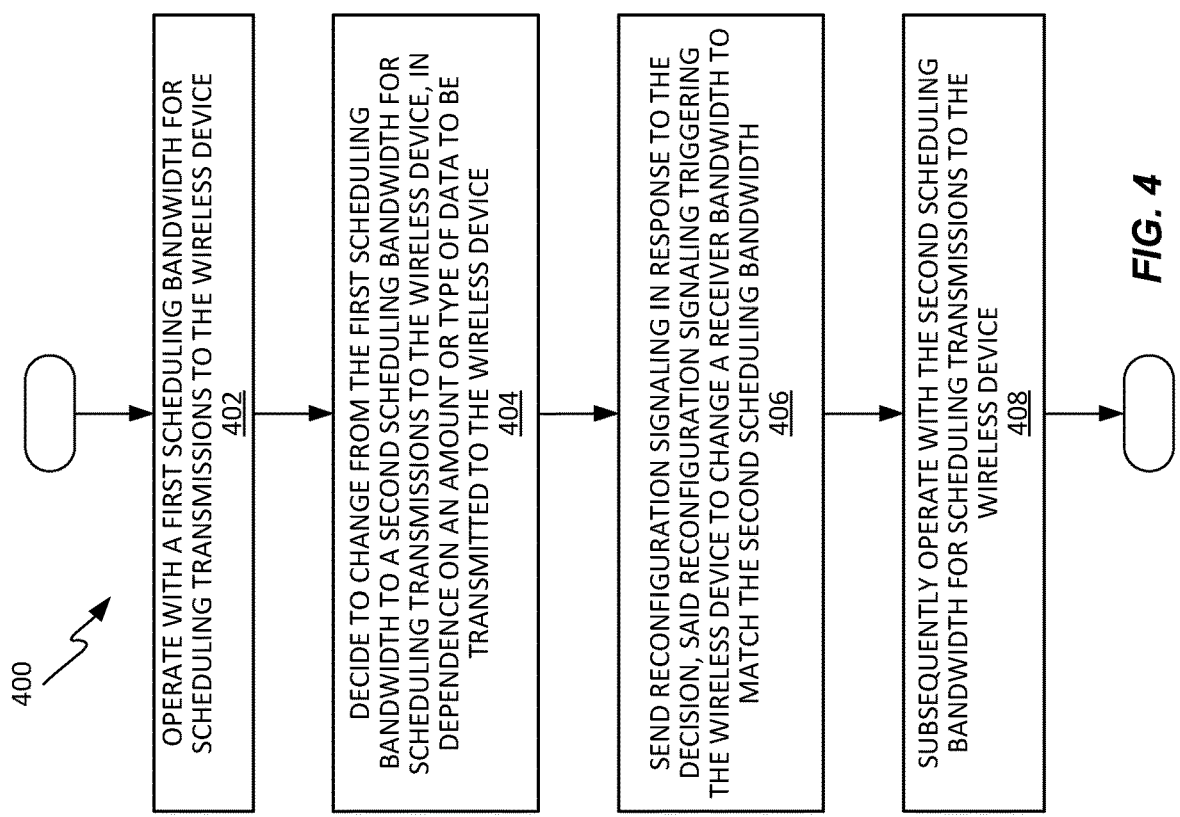
FIGS. 3 and 4 are logic flow diagrams of one or more embodiments of dynamic scheduling and receiver bandwidth adaptations, as carried out by a network node with respect to a wireless device operating in a wireless communication network.

FIG. 4 also illustrates a method 400 of processing performed by the network node 30, for example. The method 400 comprises, for example, a superset of the functionality included in the method 300 and it includes operating (Block 402) with a first scheduling bandwidth for scheduling transmissions to a device 12. Here, "operating" with the first scheduling bandwidth means using at most a first bandwidth for transmitting to the device 12, and it will be appreciated that the first bandwidth may be defined in terms of the number of resource blocks or other radio resources at a given frequency or frequencies. In this example, the network node 30 may be a base station or other wireless access point that is communicatively coupled to the device 12 via the air interface and the data in question comes into the network node 30 for delivery to the device 12 via transmission by the network node 30 over the air interface.

The method 400 further includes deciding (Block 404) to change from the first scheduling bandwidth to a second scheduling bandwidth for scheduling transmissions to the device 12. The network node 30 makes the decision in dependence on an amount or type of data to be transmitted to the device 12. For example, the network node 30 may trigger the bandwidth change in response to the amount of data queued for transmission exceeding a defined buffer threshold. Additionally, or alternatively, the network node 30 may trigger the bandwidth change in response to any one or more of: the rate of data incoming for transmission to the device 12, the size of data (e.g., packet size) to be transmitted to the device 12, the nature or type of data to be transmitted to the device 12, and one or more quality or transmission requirements associated with data to be transmitted to the device 12.

The method 400 further includes sending (Block 406) reconfiguration signalling in response to the decision, where the reconfiguration signalling triggers the device 12 to change its receiver bandwidth to match the second scheduling bandwidth. Further, the method 400 includes the network node 30 subsequently operating with the second scheduling bandwidth for scheduling transmissions to the wireless device. Operating with the second scheduling bandwidth means using radio resources within or spanning the second bandwidth for scheduling transmissions to the device 12. Where the second bandwidth is larger than the first bandwidth, the change to the second bandwidth can be understood as providing for increased throughput or enhanced transmission capability or capacity, as compared to the first scheduling bandwidth.

Figure 5:
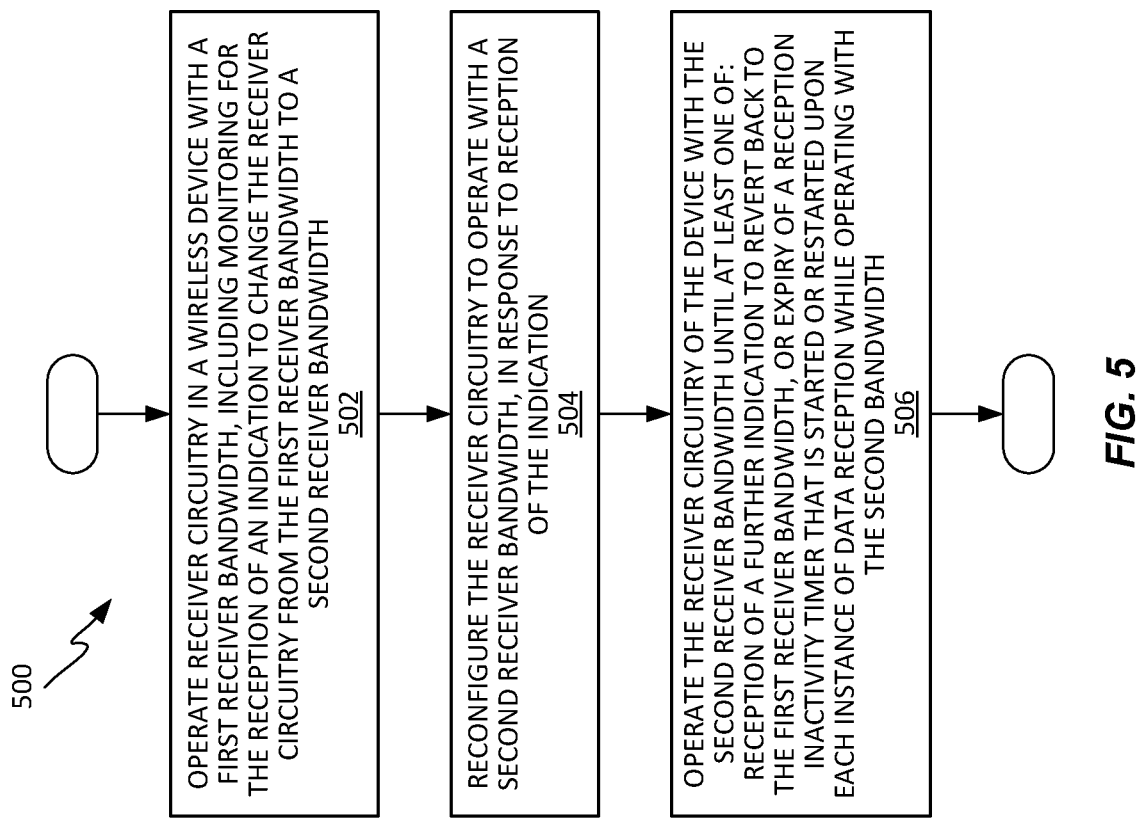
FIG. 5 is a logic flow diagram of one embodiment of dynamic receiver bandwidth adaptations, as carried out by a wireless device responsive to network control, e.g., to complement scheduling bandwidth changes made by the network with respect to the device.

FIG. 5 illustrates a method 500 of operation at a device 12, according to an example embodiment. The operations depicted in FIG. 5 complement the network-side operations seen in FIG. 4, and include a device 12 operating its receiver circuitry with a first receiver bandwidth, including monitoring for the reception of an indication to change the receiver circuitry from the first receiver bandwidth to a second receiver bandwidth (Block 502). For example, the device 12 monitors for the reception of targeted control channel signalling within those radio resources defined by the first bandwidth.

The method 500 further includes reconfiguring (Block 504) the receiver circuitry to operate with a second receiver bandwidth, in response to reception of the indication (to reconfigure receiver bandwidth), and operating (Block 506) the receiver circuitry of the device 12 with the second receiver bandwidth until at least one of: reception of a further indication to revert back to the first receiver bandwidth, or expiry of a reception inactivity timer that is started or restarted upon each instance of data reception while operating with the second bandwidth—here, "data reception" connotes the reception of data targeted to the device 12.

Figure 6:
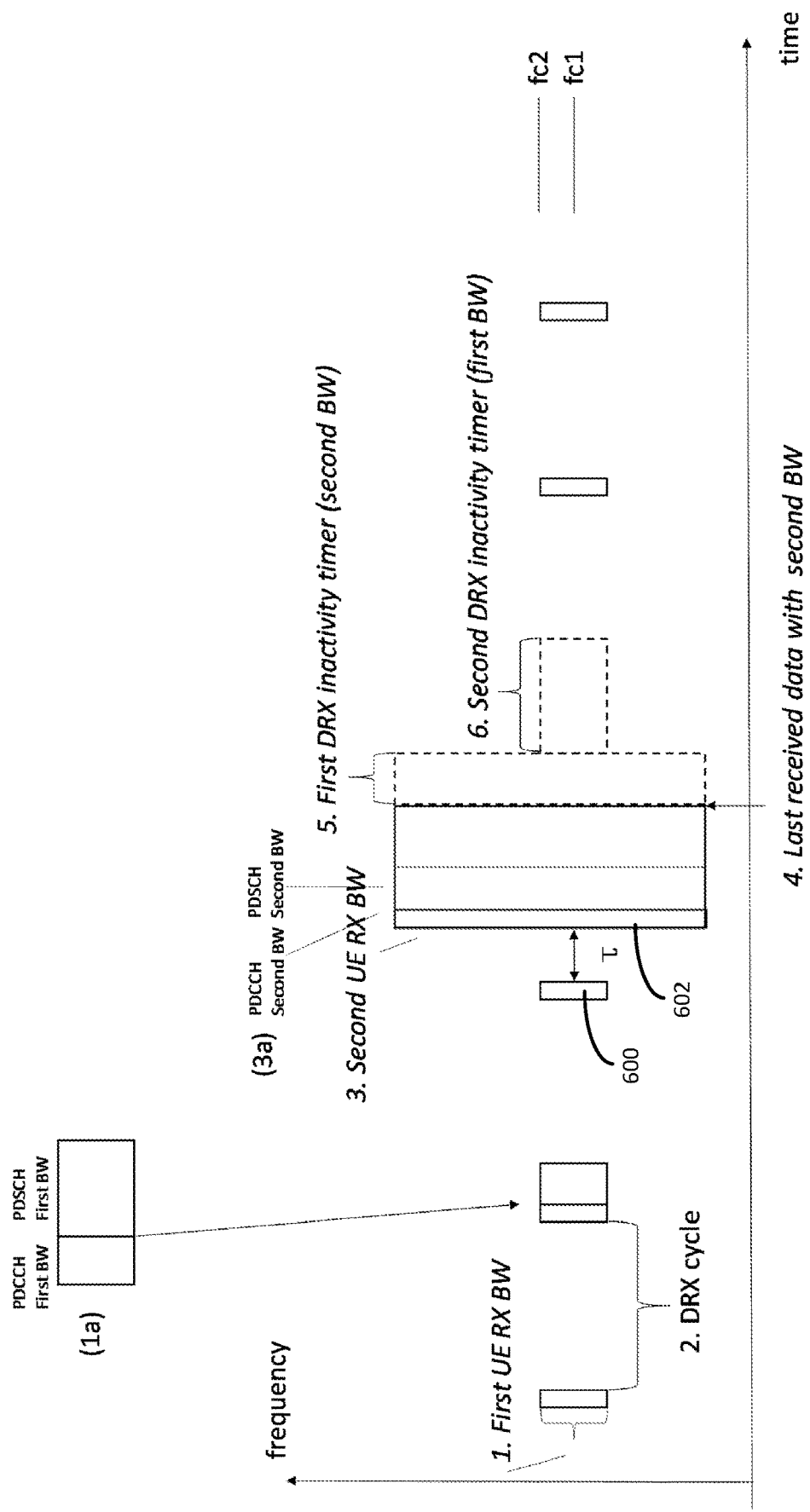
FIG. 6 is a diagram of flexible bandwidth allocation and adaptation according to one embodiment.

To better understand these and other advantages, consider FIG. 6, which illustrates certain aspects of reception and bandwidth reconfiguration for a device 12 that supports reception in at least first and second receiver BWs. The support of at least first and second BWs and, possibly, details regarding that support, represent device capabilities and, in one or more embodiments, the device 12 is configured to send capability information regarding its support for different receiver bandwidths. In one example, the BW capability information flows from the device 12 to the network 10 as part of the connection signalling associated with the device 12 connecting to the network 10. Correspondingly, the network 10, e.g., the network node 30, considers the device capability information when controlling or configuring receiver BW at the device 12.

Following the details illustrated in FIG. 6, the network node 30 configures the device 12 with a first receiver BW, for use by the device 12 in receiving and decoding a first control channel, e.g. PDCCH or NR-PDCCH). The network node 30 also configures 600 the device 12 with a larger or wider second BW, and with corresponding timers to control monitoring of the control channel in the first and second BWs.

The control channel may point to data allocated to the device 12 within the first receiver BW. In this case, the data, which is transmitted by the network 10 on a data channel, e.g. PDSCH or NR-PDSCH), may be allocated in the same slot, or subframe, or TTI as the PDCCH (see "1$a$" in FIG. 6). In case the network node 30 needs to allocate a larger amount of data to the device 12, it may "page" a PDCCH within the first receiver BW, to enable a larger BW for reception. This information may be transmitted as a Medium Access Control (MAC) or Radio Resource Control (RRC) message on the PDSCH, or sent directly by the network 10 using the PDCCH.

Once the larger, second BW is enabled, the device 12 can receive data on the data channel (e.g., PDSCH or NR-PDSCH) using the larger BW. The control information necessary for receiving the data channel using the larger BW can either be transmitted 600 at an earlier point in time using the first scheduled BW or after enabling a larger receiver BW, based on using the associated control channel 602 (e.g., the PDCCH or NR-PDCCH). The network 10 may use a delay timer $\tau$, to delay before beginning scheduled transmissions of data in the second BW, to allow time for the device 12 to reconfigure from the first receiver BW to the second receiver BW. The delay may be configured to exceed one Transmission Time Interval (TTI) or other relevant unit of time associated with scheduling. For example, in at least one embodiment, the delay timer $\tau$ has a delay value from one to four TTIs.

In some embodiments, the first receiver BW constitutes the central portion of the second receiver BW. However, that arrangement is not limiting and other first-to-second receiver BW arrangements are contemplated. As a more general proposition, it is not necessary for the first and second BWs to have the same centre frequency—i.e., $fc1 \neq fc2$, where $fc1$ is the centre frequency of the first BW and $fc2$ is the centre frequency of the second BW. From the discussion above, there may also be a third BW, a fourth BW, etc., for other scenarios and device needs, which are allocated in a similar way.

Thus, it is contemplated herein that the network 10 may, with respect to a device 12, dynamically adapt the scheduling BW used by the network 10 for the device, by selecting or re-selecting a BW from among two or more BWs, in dependence on the nature and/or amount of data to be transmitted to the device 12. Correspondingly, the device 12 may dynamically adapt its receive bandwidth to match the scheduling BW, based on selecting between or among two or more receiver BWs in response to reconfiguration triggering or signalling incoming from the network 10.

Figure 7:
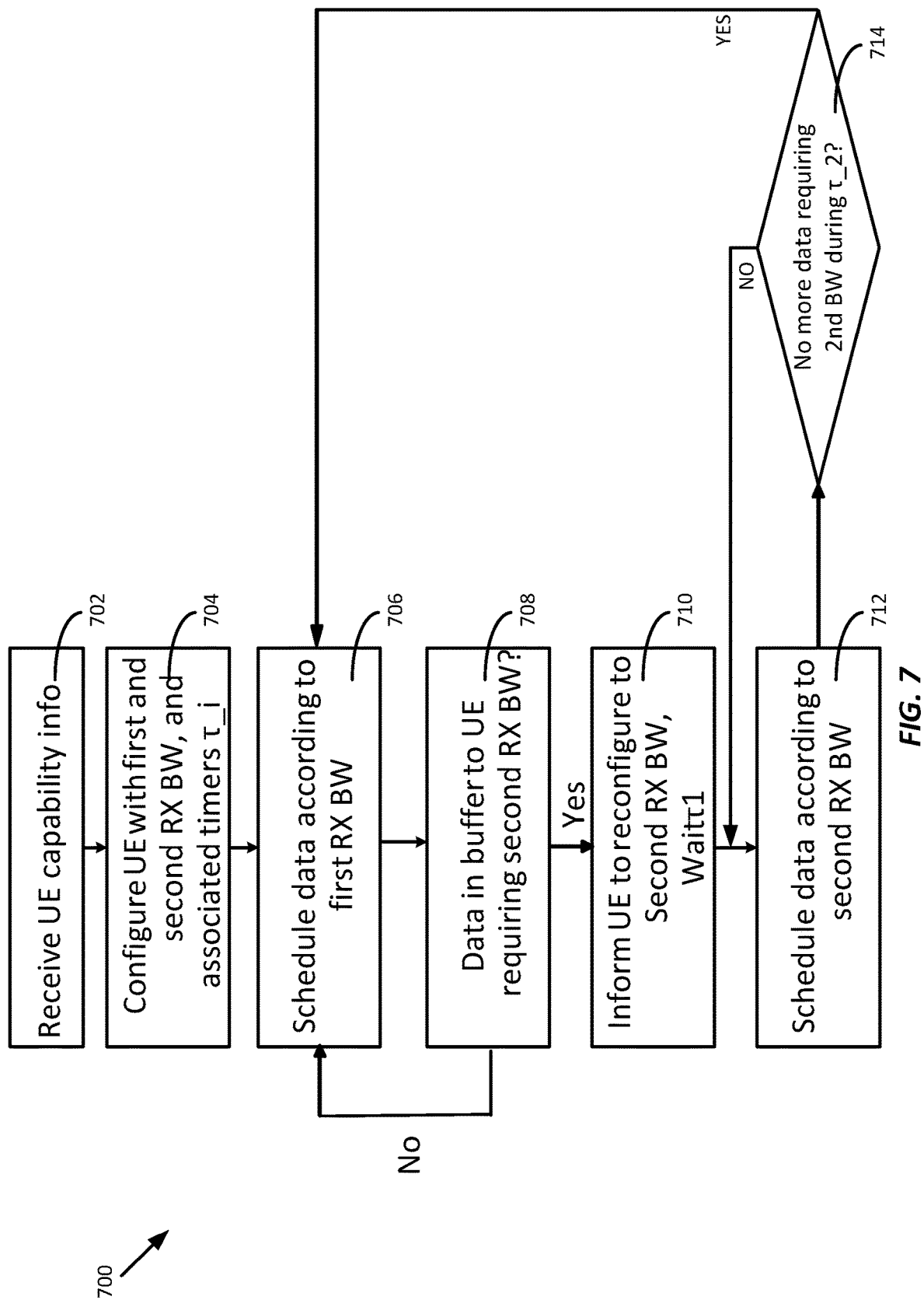
FIG. 7 is a logic flow diagram of one embodiment of a method of operation at a network node.

FIG. 7 is a flow diagram depicting a method 700 for the dynamic scheduling and receiver bandwidth control and configuration contemplated herein, as carried out on the network-side in one or more embodiments. The method 700 may be understood as an example implementation of the method 400 introduced earlier, and it involves a network node 30 operating as a "serving network node" for a device 12, e.g., the network node 30 is an eNodeB or other access point that provides radio connectivity between the network 10 and the device 12.

The method 700 includes the network node 30 receiving (Block 702) device capability information, where FIG. 7 refers to the device 12 as a "UE." The capability information may include multiple items of information but at least includes one or more items of information pertaining to the bandwidth capabilities of the device 12. The method 700 further includes the network node 30 configuring (Block 704) the device 12 with a first scheduling BW for causing the device to operate according to a first receiver BW and with a second scheduling BW for causing the device to operate according to a second receiver BW.

In an example case, the first receiver BW is smaller than the second receiver BW and, therefore, uses fewer network resources and may require less power consumption and/or lower processing overhead for the device 12, as compared to use of the larger, second receiver BW. Here, it will be appreciated that the device 12 operates with one or the other receiver BW (the first or the second) at any given time, e.g., it selects one of the first and second BWs and configures its receiver circuitry accordingly.

The network node 30 schedules data for the device 12 according to the first receiver BW (Block 706), where such scheduling may be done on a recurring or as needed basis, in dependence on the network 10 receiving or having downlink data to send to the device 12. As part of such processing, the network node 10 monitors the data incoming for transmission to device 12 to determine whether the second BW should be used—e.g., for larger amounts of data and/or for higher-rate data. In a particular example, the network node 30 determines whether data in the transmit buffer for the device 12 requires the second receiver BW (Block 708). If not (NO from Block 708), the network node 30 does not initiate a reconfiguration of the device 12 from the first BW to the second BW. If so (YES from Block 708), the network node 30 initiates a reconfiguration of the device 12 from the first receiver BW to the second receiver BW (Block 710).

Reconfiguration processing includes a programmed or defined delay by the network node 10 before it begins scheduling downlink data towards the device 12 in the second BW. That is, the network node 30 waits before beginning scheduling data for the device 12 according to the second receiver BW—also referred to as the second scheduling BW—by a period denoted as $\tau 1$. After delaying, the network node 30 begins scheduling (Block 712) data for transmission to the device 12, where such scheduling operations make use of the larger, second receiver BW. The second receiver BW may be associated with a time $\tau 2$, which denotes a time of an inactivity timer where the second receiver BW is not used, i.e. when the network node 30 determines that there is no more data in the buffer requiring the second BW (Block 714) and may thus revert to use of the first BW for scheduling data transmissions to the device 12.

As noted, the device capability information received in Block 702 may be received during initial connection signalling for connection setup. Additionally, or alternatively, the device capability information may be received from the device 12 in handover, or, more generally, in association with a mobility event. Broadly, the capability information at least indicates receiver bandwidth capabilities of the device 12. As an example, in one or more such embodiments, the capability information indicates two or more PDCCH monitoring BWs the device 12 is capable of using.

Of further note, Block 704 in the method 700 is an optional step in at least some embodiments. For example, the relevant parameters may be preconfigured in the device 12, or otherwise known to it. If the configuration message is sent to the device 12, it may include or indicate first and second PDCCH monitoring BWs. For example, the network node 30 indicates the number of (radio) resource blocks, and the centre or start frequency/resource block for monitoring. In at least one embodiment, the network node 30 also sends information about timers related to the PDCCH monitoring as described above.

With the method 700 as one example, it will be appreciated that a network node 30 configured according to one or more embodiments contemplated herein may be configured to serve a device 12 using a flexible or dynamically adjusted scheduling BW. One may assume that the device 12 is operating according to a first receiver BW and that network node 30 uses that first receiver BW as the scheduling BW for scheduling data transmissions to the device 12. Advantageously, however, the network node 30 monitors whether there is a need for scheduling data for the device 12 on a larger, second BW. If so, the network node 30 indicates the BW reconfiguration to the device 12, e.g., it sends the indication on a control or data channel in the first BW, such as by sending it on a PDCCH or PDSCH in the first BW.

The network node 30 then observes a programmed or defined delay before it begins scheduling data transmissions to the device 12 using the second BW. The delay allows time for the device 12 to reconfigure its receiver bandwidth, or otherwise ready itself for operation according to the second receiver BW. If no more large-BW data needs to be scheduled to the device 12, the network node 30 returns to using the first scheduling BW. However, as when changing from the first scheduling BW to the second scheduling BW, the network node 30 may wait for a defined delay after going back to the first BW before beginning scheduling data for the device 12 in the first BW. The scheduling resumption delay $\tau 2$ when changing back to the first BW from the second BW may be the same or different than the scheduling resumption delay $\tau 1$ used by the network node 30 when changing from the first BW to the second BW. One possible approach comprises, assuming that the second BW is currently used, that the network node 30 determines that the first BW is sufficient, wherein the network node starts using only the first BW. The wireless device still at this point uses the second receive BW, which is feasible if the second BW completely includes the first BW. The wireless device may then determine that it has been scheduled for a time duration, wherein an inactivity timer elapses and the wireless device reduces receive BW to e.g. the first BW, a certain fraction of the second BW, or other narrower BW than the second BW. The network node may pause its transmission for a time $\tau 2$ seconds to give wireless device time for BW change.

In another example, the device 12 is operating according to a first receiver BW and the network node 30 uses that first BW for scheduling data transmissions to the device 12. The network node 30 determines that the device 12 should be reconfigured to a larger, second receiver BW, e.g., for sending a larger amount of data or for sending data at a higher rate. The network node 30 indicates the reconfiguration to the device 12, or otherwise initiates the reconfiguration. The network node 30 then begins scheduling data transmissions to the device 12 using the second BW, although, as noted, it may wait before beginning scheduled transmissions in the second BW, to allow for reconfiguration at the device 12.

The network node 30 subsequently determines that the second BW is no longer needed and it reverts to using the first BW. The reversion may include a delay before it begins any scheduled data transmissions in the first BW for the device 12, to account for reconfiguration at the device 12, and the network node 30 may signal the reversion to the device 12.

Figure 8:
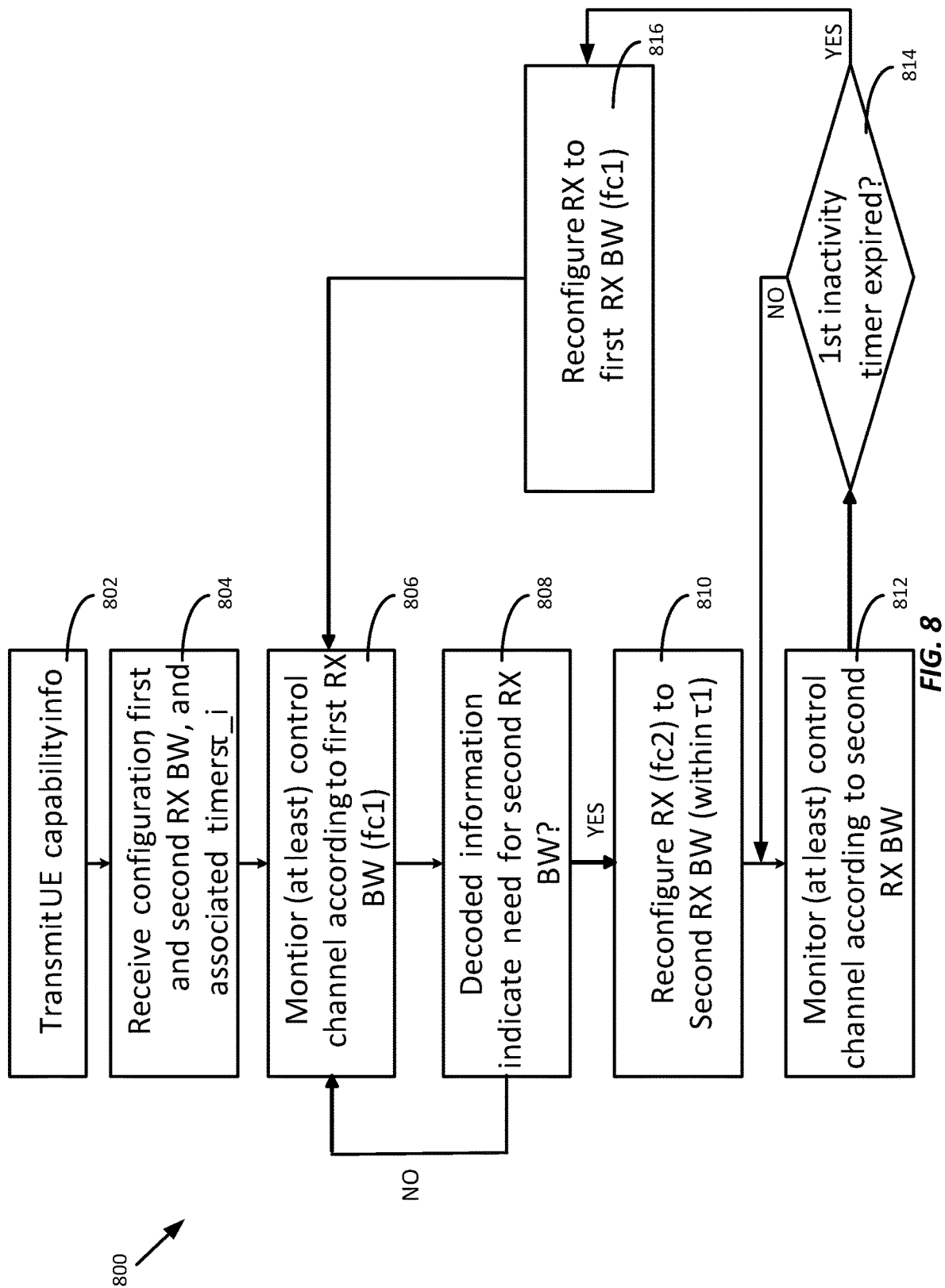
FIG. 8 is a logic flow diagram of one embodiment of a method of operation at a wireless device.

FIG. 8 illustrates a method 800 of processing at the device 12, according to an example embodiment. The method 800 includes the device 12 (denoted as "UE" in the diagram) sending device capability information to the network 10, e.g., at connection set up, at handover, etc. (Block 802). The capability information indicates receiver bandwidth capabilities of the device 12 and may be expressed in terms of resource blocks, for example. A "resource block" comprises, for example, a certain number of "resource elements,", e.g. 12 or 16 resource elements along the frequency axis, where a "resource element" comprises the smallest modulation structure available for radio transmission. In particular, a "resource element" may be a particular OFDM subcarrier taken in a particular OFDM symbol time.

The method 800 further includes the device 12 receiving configuration information (Block 804), e.g., indicating first and second reception BWs and any associated timers. The device 12 then monitors a PDCCH or other control channel in the first BW, at configured time instances (Block 806). If information decoded from the PDCCH in the first BW, or decoded from an associated PDSCH or other data channel, indicates that the device 12 should reconfigure for reception in the second BW (YES from Block 808), the device 12 reconfigures its radio receiver(s) to support PDCCH monitoring using the second receiver BW (Block 810). The reconfiguration may be done within a timer (τ1 and/or τ2), where the timer may be configured by the network node 30 and received by the device 12 in a configuration message, be predefined, or have fixed value(s). Thus, the wireless device reconfigures within the time τ1 so it can monitor and decode for example NR-PDCCH and NR-PDSCH in the second receiver BW.

The method 800 continues with the device 12 monitoring the PDCCH within the second receiver BW at configured time instances, e.g., at configured sub frames or TTIs (Block 812). Once no more data is received using the wider BW, e.g. only data within the first BW or no data at all, the device 12 starts a first inactivity timer (e.g., configured by the network node 30). Upon expiry of the timer (Block 814), the device 12 reverts to the first receiver BW (Block 816), and resumes monitoring the PDCCH in the first receiver BW (Block 806).

Turning back to FIG. 6, it will be appreciated that the teachings herein contemplate DRX operation and related details. For example, the device 12 may be configured with a DRX cycle, and may monitor the PDCCH in the first receiver BW during an "on duration." Absent receiving a reconfiguration trigger or message indicating that it should reconfigure to the second receiver BW, the device 12 continues operating/monitoring in the first receiver BW, according to the configured DRX cycle. However, in response to receiving a reconfiguration trigger or message—on the PDCCH or PDSCH in the first BW—the device 12 reconfigures its receiver(s) for operation according to the second receiver BW. That is, the device 12 reconfigures for monitoring data and/or control information targeted to it in the second BW.

The device 12 uses a first DRX inactivity timer to time-out of operation in the second BW, e.g., by starting or restarting a timer after each reception event. The reception event may be within the first BW or within a part of the second BW. Until the timer expires, the device 12 continues monitoring in the second BW, but it reverts back to e.g. the first BW or another BW narrower than the second BW upon expiry of the first DRX inactivity timer. The device 12 then performs monitoring in the first BW, according to a second DRX inactivity timer. Thus, the device 12 may monitor the second BW during the period defined by the first inactivity timer, and if no reception occurs during that time, the device 12 transitions back to the first BW and monitors that BW for a period defined by a second inactivity timer. If no reception occurs during a second inactivity period, e.g., no reception of PDCCH, the device 12 may put its receiver into a sleep mode until the next reception time, which is defined by a predetermined DRX cycle. The timer configurations for the first and the second inactivity timers may be provided to the device 12 by the serving network node.

Figure 9:
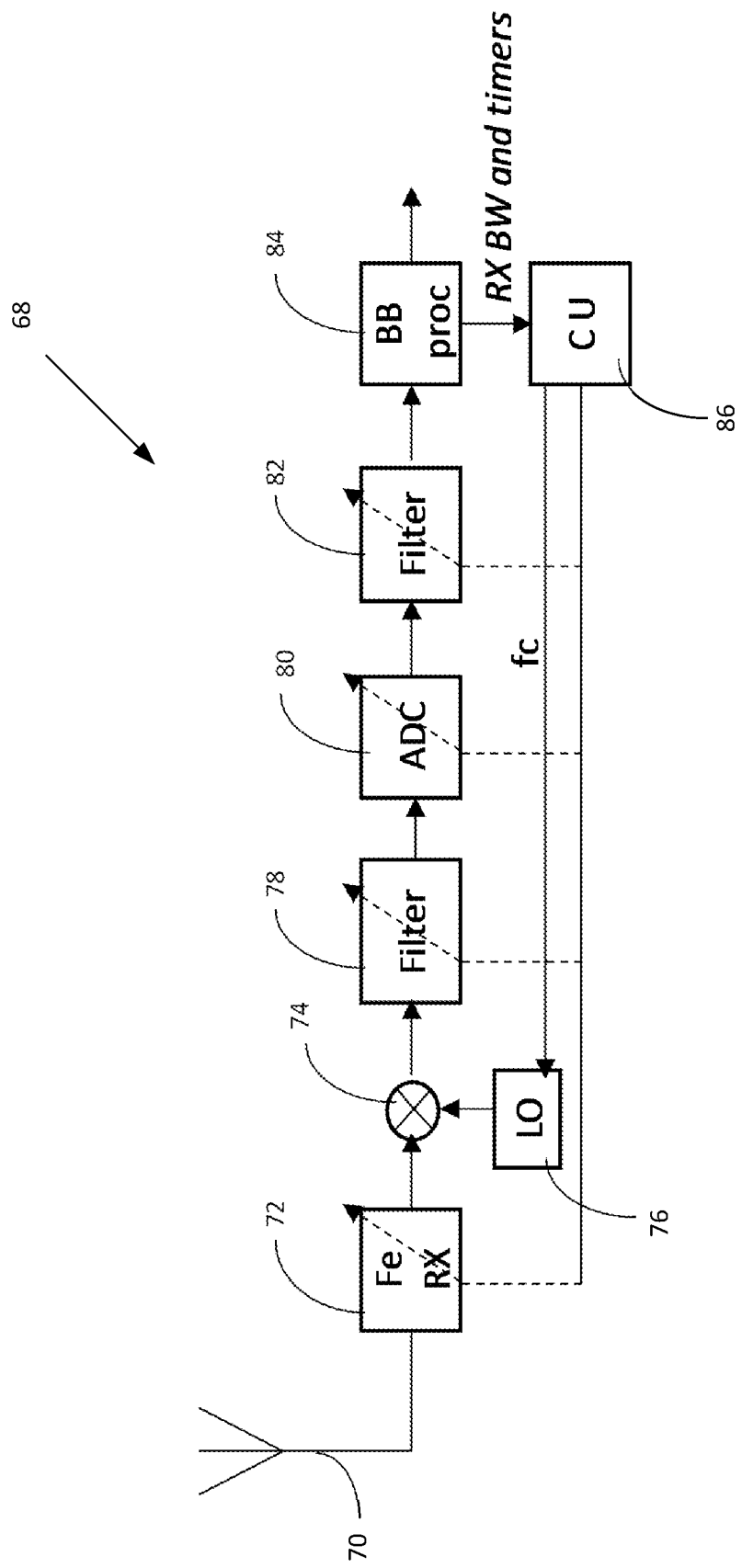
FIG. 9 is a block diagram of one embodiment of configurable receiver circuitry that supports dynamic reconfiguration between or among two or more receiver bandwidths.

The particular mechanisms or operations performed by a device 12 for reconfiguring its receiver BW will depend to some extent on the implementation details of the involved receiver circuitry. FIG. 9 illustrates such circuitry according to one or more embodiments, and it will be appreciated that the receiver circuitry 68 depicted in FIG. 9 may be included in the RF transceiver circuitry 54 seen in FIG. 2 for the device 12.

The receiver circuitry 68 is shown in association with one or more receiver antennas 70 and it includes an analog front-end (FE) 72 with elements that are mainly used for filtering out the frequency band used for reception and low-noise amplifier (LNA) for low-noise amplification, local oscillator generation 76 together with down converting mixer 74 for down converting from the reception frequency to baseband followed by filter 78 and analog-to-digital converter (ADC) 80, which together obtain digital baseband signal samples corresponding to antenna-received signals. Further filtering via the filter 82 provides the baseband (BB) processor 84 with filtered baseband signals.

All or at least some of these circuit elements are reconfigurable in terms of bandwidth, and one or more of them may consume less power or require less processing overhead when operated at smaller bandwidths, as compared to when operated at larger bandwidths. Advantageously, then, the network node 30 uses a smaller scheduling BW unless it determines that a larger scheduling BW is needed, at which point it initiates a reconfiguration of the receiver BW of the device 12, to change from the smaller BW to the larger BW. Correspondingly, a control unit (CU) 86, which may be part of the processing circuitry 56 illustrated for the device 12 in FIG. 2, controls the bandwidth of the receiver circuitry 68 accordingly.

As another example of how the device 12 may optimize receiver operations in consideration of the BW, consider an example where the first BW comprises the central portion of the overall system BW of the serving network node and device 12. Signals adjacent in frequency will for example be those of the serving network node, e.g. scheduled to other users in the same cell or area, and may have similar spectral density as the signal to be received by the device 12. Potential interferers outside the system BW of the serving NW node will reasonably be more distant in frequency to the first receiver BW of the device 12. Interfering signals in the first receiver BW may be limited to same-cell signals targeting other users within the same area. Hence, the interfering signals may be similar to the desired signals targeted to the device, in terms of power, etc. Consequently, the device 12 may not need to use as steep roll-off in its blocking filtering as is needed when operating in the second BW, which may include relatively high-power interfering signals from one or more other nodes in the network 10 that do not necessarily coordinate their transmissions with respect to transmissions by the serving node of the device 12.

Alternatively, or in addition to the above, the LO generation may also be reconfigured as part of the receive-BW reconfiguration operations at the device 12, because higher phase noise levels may be acceptable at a given offset from the first receiver BW when blocking/interfering signals are more distant in frequency. If the first receiver BW is much smaller than the serving NW node system BW (a tenth or less) it may be justified also to jointly reconfigure the LNA and the mixer. While the second receiver BW may be processed at the device 12 using a conventional wideband LNA/mixer topology, the device 12 in one or more embodiments is configured to process the first receiver BW using a frequency-translation LNA/mixer topology (also known as an N-path filter). The latter cannot be used for the second receiver BW because of the stringent selectivity requirements but may be sufficient or at least constitute a substantial contribution to the overall selectivity prior to the ADC.

Correspondingly, in one or more embodiments, the device 12 uses different types of ADCs (or different ADC configurations) for the first and second receiver BWs. For example, the device 12 uses a Nyquist ADC for the second receiver BW but uses a filtering/oversampling ADC for the first receiver BW (e.g. filtering Delta-Sigma modulator ADC). In the latter case, the filtering of the ADC may suffice for the analog baseband selectivity such that no separate baseband analog filter is required.

Thus, bandwidth configuration and receiver optimization as contemplated herein for the device 12 may include adaptive filter functions, as well as selective filter functions enabling or disabling, or bypassing, as well as adaptive control of the ADC process. Still further, the CU 86 may adapt the LO 76 in conjunction with reconfiguring the receiver circuitry 68 to operate at one bandwidth or another. For example, the LO 76 may be arranged to align its generated frequency to centre of the first BW.

According to one example, a network node is configured to schedule data for a wireless device according to a first bandwidth (BW), determine buffered data for the wireless device requiring a second BW, wherein the second BW is larger than the first BW, signal the wireless device to reconfigure for the second BW, and schedule data for the UE according to the second BW. The network node may be further configured to, when operating according to the second BW, determine buffered data for the wireless device not requiring the second BW, signal the wireless device to reconfigure for the first BW, and schedule data for the wireless device according to the first BW. Discontinuous Reception (DRX) may be applied when operating according to the first BW. The network node may be configured to interact with the wireless device, to determine capabilities of the wireless device, and to determine at least one of the first and the second BWs from the determined capabilities of the wireless device.

According to one example, a wireless device is configured to monitor a channel according to a first bandwidth (BW), receive signalling from a network node for reconfiguring to a second BW, wherein the second BW is larger than the first BW, and reconfigure to receive data according to the second BW. The wireless device may be configured to receive signalling from the network node, when operating according to the second BW, for reconfiguring to the first BW, and reconfigure to the first BW. The wireless device may be configured to apply discontinuous reception (DRX) when operating according to the first BW. The wireless device may be configured to send capability information to the network node regarding at least one of the first and second BWs.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A wireless communication device configured for operation in a wireless communication network and comprising:
   receiver circuitry configured for receiving signals from a serving node in the network, said receiver circuitry having a dynamically configurable bandwidth; and
   processing circuitry configured to control the dynamically configurable bandwidth of the receiver circuitry to:
   monitor a first downlink bandwidth for downlink transmissions by the serving node, the first downlink bandwidth being only a portion of an overall system bandwidth of the serving node;
   receive control signaling in the first downlink bandwidth, indicating a change from the first downlink bandwidth to a second downlink bandwidth;
   in response to the indicated change, monitor the second downlink bandwidth for downlink transmissions by the serving node, the second downlink bandwidth being only a portion of the overall system bandwidth; and
   in response to expiration of a reception inactivity timer while monitoring the second downlink bandwidth, change from the second downlink bandwidth to the first downlink bandwidth or a third downlink bandwidth, the third downlink bandwidth being only a portion of the overall system bandwidth.

2. The wireless communication device of claim 1, wherein the processing circuitry is further configured to receive bandwidth configuration information from the serving node, said bandwidth configuration information indicating at least one of: the first, second, or third downlink bandwidths, or the reception inactivity timer.

3. The wireless communication device of claim 1, wherein the second downlink bandwidth is wider than the first downlink bandwidth.

4. The wireless communication device of claim 1, wherein the processing circuitry is configured to control one or more filtering, analog-to-digital-conversion, and/or local-oscillator settings for reduced power when the receiver circuitry is configured for the first downlink bandwidth, as compared to when the receiver circuitry is configured for the second downlink bandwidth.

5. The wireless communication device of claim 1, wherein the wireless communication device further comprises transmitter circuitry configured for transmitting signals to the network, and wherein the processing circuitry is configured to transmit, via the transmitter circuitry, capability information to the network, said capability information indicating one or more capabilities of the wireless communication device with respect to receiver bandwidth reconfiguration.

6. A method of a wireless communication device configured for operation in a wireless communication network, comprising, based on controlling a dynamically configurable bandwidth of receiver circuitry of the wireless communication device:
 monitoring a first downlink bandwidth for downlink transmissions by a serving node of the wireless communication device in the wireless communication network, the first downlink bandwidth being only a portion of an overall system bandwidth of the serving node;
 receiving control signaling in the first downlink bandwidth, indicating a change from the first downlink bandwidth to a second downlink bandwidth;
 in response to the indicated change, monitoring the second downlink bandwidth for downlink transmissions by the serving node, the second downlink bandwidth being only a portion of the overall system bandwidth; and
 in response to expiration of a reception inactivity timer while monitoring the second downlink bandwidth, changing from the second downlink bandwidth to the first downlink bandwidth or a third downlink bandwidth, the third downlink bandwidth being only a portion of the overall system bandwidth.

7. The method of claim 6, comprising receiving bandwidth configuration information from the network, said bandwidth configuration information indicating at least one of: the first, second, or third downlink bandwidths, or the reception inactivity timer.

8. The method of claim 6, wherein the control signaling comprises a Physical Downlink Control Channel, PDCCH.

9. The method of claim 6, further comprising configuring the reception activity timer according to configuration information received from the serving node.

10. A non-transitory computer readable medium storing a computer program comprising instructions that, when executed on a processor of a wireless communication device, cause the wireless communication device to control a dynamically configurable bandwidth of receiver circuitry of the wireless communication device, to:
 monitor a first downlink bandwidth for downlink transmissions by serving node of the wireless communication network in the wireless communication network, the first downlink bandwidth being only a portion of an overall system bandwidth of the serving node;
 receive control signaling in the first downlink bandwidth, indicating a change from the first downlink bandwidth to a second downlink bandwidth;
 in response to the indicated change, monitor the second downlink bandwidth for downlink transmissions by the serving node, the second downlink bandwidth being only a portion of the overall system bandwidth; and
 in response to expiration of a reception inactivity timer while monitoring the second downlink bandwidth, change from the second downlink bandwidth to the first downlink bandwidth or a third downlink bandwidth, the third downlink bandwidth being only a portion of the overall system bandwidth.

* * * * *